(12) United States Patent
Shipston et al.

(10) Patent No.: US 7,735,271 B1
(45) Date of Patent: Jun. 15, 2010

(54) CRAWL SPACE ENCAPSULATION SYSTEM

(76) Inventors: Lorri B. Shipston, 1208 George II Hwy. SE., Bolivia, NC (US) 28422; Mark Pavlansky, 11831 NC Hwy. 268, Elkin, NC (US) 26621

( * ) Notice: Subject to any disclaimer, the term of this patent is extended or adjusted under 35 U.S.C. 154(b) by 502 days.

(21) Appl. No.: 11/706,496

(22) Filed: Feb. 15, 2007

Related U.S. Application Data (60) Provisional application No. 60/773,617, filed on Feb. 16, 2006.

(51) Int. Cl.
 *E04B 1/62* (2006.01)
 *E02D 19/00* (2006.01)
 *B32B 27/00* (2006.01)

(52) U.S. Cl. .................. 52/169.11; 52/309.8; 52/408; 52/409

(58) Field of Classification Search .............. 52/61, 52/62, 94, 131, 169.11, 169.14, 169.5, 236.7, 52/293, 293.3, 302.1, 302.3, 302.6, 317, 52/366, 404.1, 406.1, 406.2, 407.3, 407.4, 52/407.5, 408, 411, 412, 169.12, 309.8, 309.9, 52/409, 900; 428/74, 126, 128, 131, 192, 428/193, 252, 284, 285, 343, 423.1, 914; 156/204; 405/229, 270
See application file for complete search history.

(56) References Cited

U.S. PATENT DOCUMENTS

| | | | |
|---|---|---|---|
| 4,841,710 A * | 6/1989 | Considine ............... 52/745.09 |
| 4,927,705 A * | 5/1990 | Syme et al. ................ 428/192 |
| 5,011,879 A * | 4/1991 | Uesaka et al. .............. 524/290 |
| 5,091,235 A | 2/1992 | Vergnano |
| 5,642,967 A | 7/1997 | Swain et al. |
| 5,678,371 A | 10/1997 | Wills |
| 5,733,624 A * | 3/1998 | Syme et al. ................... 428/68 |
| 5,766,721 A * | 6/1998 | Bussey et al. ................ 428/71 |
| 6,014,841 A * | 1/2000 | McCoy et al. ................. 52/19 |
| 6,083,603 A * | 7/2000 | Patel et al. .................. 428/128 |
| 6,191,057 B1 * | 2/2001 | Patel et al. .................. 442/398 |
| 6,575,666 B1 | 6/2003 | Janesky |
| 6,601,352 B1 * | 8/2003 | Obermeyer et al. .......... 52/202 |
| 6,698,157 B1 * | 3/2004 | Porter ....................... 52/794.1 |
| 6,848,492 B2 * | 2/2005 | Thomas .................. 160/368.1 |
| 6,926,469 B2 | 8/2005 | Janesky |
| 2006/0123723 A1 * | 6/2006 | Weir et al. ................. 52/302.1 |
| 2007/0193151 A1 * | 8/2007 | Anderson .................. 52/302.3 |

OTHER PUBLICATIONS http://www.healthgoods.com/Education/Healthy_Home_Information/Building_Design_and_Construction/foam_board.htm.

* cited by examiner

*Primary Examiner*—Robert J Canfield
(74) *Attorney, Agent, or Firm*—Robert W. Pitts (57) ABSTRACT

A system for forming an insulating vapor barrier in a building is especially suited for forming an insulating vapor barrier in a crawl space beneath a building. The system includes a series of separate vapor barrier panels that can be attached around a wall. A ground level vapor barrier can be sealed to the insulating vapor barrier panels, which can be sealed to each other and along a top edge to the wall. The individual vapor barrier panels include an insulating foam member with a vapor resistant liner laminated thereto and extending beyond the edges of the insulating foam member to provide space for securing and sealing multiple vapor barrier panels to form a continuous insulating vapor barrier. Mechanical or hook and loop fasteners can be provided to secure the top edges of the vapor barrier liners to the wall and bottom edges to a ground liner.

6 Claims, 6 Drawing Sheets

CRAWL SPACE ENCAPSULATION SYSTEM

CROSS REFERENCE TO PRIOR CO-PENDING APPLICATIONS

This application claims the benefit of prior filed, U.S. Provisional Patent Application Ser. No. 60/773,617 filed Feb. 16, 2006.

FIELD OF THE INVENTION

The present invention relates to a system used to encapsulate a crawl space, a plastic laminate using both a film and a polyolefin foam or a film and an expandable polystyrene foam. The encapsulating system enhances clean airflow, significantly reduces mold spore production, prevents pest migration, and prevents certain moisture damage from attacking the foundational carpentry of a residential structure

BACKGROUND OF THE INVENTION

Homes are often built with crawl spaces underneath substantially all or a significant portion of the structure. The crawl space is typically left in a natural state with open soil left in the condition that existed prior to and after the building was completed. The foundation of a home is usually concrete and cinder blocks that support lumber flooring, wall supports and the roof. Rain and snow permeate the soil, so moisture easily develops in the space between the ground and the flooring which is destructive to the materials used in building the foundation and unhealthy for the home occupant.

Soil in most parts of the United States has a high moisture content. This moisture will readily work its way from the soil up into the crawl space, eventually into the structure of the house, and finally into the living space. Crawl spaces in southeastern United States homes where humidity levels are typically high and the soil has a relatively high moisture content have been studied extensively with respect to moisture issues. Though the crawl space is a convenient place for locating plumbing, heating, air conditioning systems, and ductwork, moisture will gather in this area and will move into the living area of the house.

Numerous types of mold will thrive in a damp and moist environment, reproducing millions of spores that will ultimately reach the home living space by airflow that naturally carries them upward from a damp crawlspace. Heat causes an air mass to rise. Air located in the crawl space will become warm by being located near sources of heat in a residence. Once the crawl space air masses are heated, they move into living areas. Since relative humidity levels in most crawl spaces are in the range of from 50-90%, mold has a receptive environment in which to easily develop and spread. Mold can grow on dirt, construction debris, house framing, and under carpeting. Mold will feed on organic materials and then destroy those materials as it continues to feed and grow.

Some techniques for reducing moisture build up in a crawl space involve ventilating the area. Ventilation is accomplished passively by providing openings in the foundation to allow airflow from the crawlspace to the outside air and mechanically by installing air circulating fans. Heating and cooling costs can be significantly higher for homes that have a crawl space vented by either a passive or a mechanical air flow system.

Passively vented crawl spaces, the most common form of crawl space treatment, are the most prone to accumulate moisture and to use the most energy.

As a means to promote energy efficiency, the US Department of Energy recommends that if the crawlspace is to be unvented, all holes in the foundation where outside air can enter should be sealed. It is recommended that a polyethylene vapor retention member, or equivalent material, should be installed over a dirt floor. The polyethylene barrier can be covered with a layer of sand or concrete to protect it from damage, but gravel, or anything that could pierce the barrier, should not be employed. Another recommendation is to run the plastic vapor barrier up the walls forming the crawl space, and this plastic barrier should be attached to the first piece of wood (the sill plate or mudsill). Rigid insulation foam board should be installed against the foundation from the subfloor to the plastic (or concert slab) on the floor of the crawlspace. It is suggested that this be done around the perimeter of the foundation. An alternate to the use of foam board is to drape fiberglass roll insulation down the foundation walls with edges butted tightly together. Roll fiberglass insulation is commonly used between the floor joists. This is an acceptable alternative to foam board insulation as long as the crawl space remains dry. However, some state building codes require inspection gaps between the sill plate and the start of the encapsulation material. This means that the vapor barrier material cannot be attached directly to the sill plate.

Some systems that offer a dry crawl space utilize material such as 0.006-0.012 inch thickness polyethylene film to provide a vapor barrier. Such systems eliminate crawl space in and out airflow, completely encapsulate the ground and the walls of the crawl space and prohibit any passive airflow in it. Using this encapsulation system, energy expenses can be reduced by more than 15% each year. These systems provide benefits in moisture management, pest control, radon reduction, and thermal insulation. The most important function is providing an airflow barrier, and the most significant shortcoming is not providing enough thermal insulation.

One system providing complete crawlspace encapsulation uses a 0.020 inch high density polyethylene and low density material formed of seven blended layers. This product is very similar to the material used as swimming pool liners. A product sold as the CLEAN SPACE CRAWL SPACE ENCAPSULATION SYSTEM has been utilized and successfully eliminated moisture that leads to the growth of unhealthy mold from entering living areas. CLEAN SPACE and CRAWL SPACE ENCAPSULATION SYSTEM are registered trademarks of Basement Systems, Inc. However, the material is relatively heavy (a roll typically weighing 110 pounds) and is difficult to handle in the confines of a crawlspace during installation.

SUMMARY OF THE INVENTION

Encapsulating a crawlspace in an energy efficient and cost effective manner requires two accomplishments. The first is to provide ample insulation to the floor and interior walls of the crawl space, and the second is to provide a near perfect vapor barrier.

Sealing the crawl space from the living space is accomplished by providing a vapor barrier that will reject the transmission of mold spores, enhance the quality of breathable air, and enhance the insulating properties of the home. The current invention for encapsulating a crawl space can utilize two types of foamed plastic laminated to a liner to seal off the crawl space from the living space.

The first foamed plastic can be polyolefin foam from 2-3 inches thick with a laminated film applied directly to the masonry or block wall. Another foamed plastic can be an expanded polystyrene (EPS), with a liner which is affixed to the masonry or block walls.

By combining a vapor barrier with foam insulation into a single product, the need for additional rigid foam board on the walls or for draping fiberglass roll insulation over the foundation walls would be eliminated. Batt insulation in the floor joists would also be unnecessary.

DETAILED DESCRIPTION OF THE PREFERRED EMBODIMENTS

Several versions of a laminated vapor barrier 10 are depicted in FIGS. 1-8 and 11-19. These laminated insulated vapor barriers 10 include both an insulating foam member 12 and at least one liner layer 14. Since the thickness of the liners 14 is less than the thickness of the foam members 12, the drawings are not necessarily to scale, because the liners 14, and their features could not otherwise be clearly represented.

Figure 1:
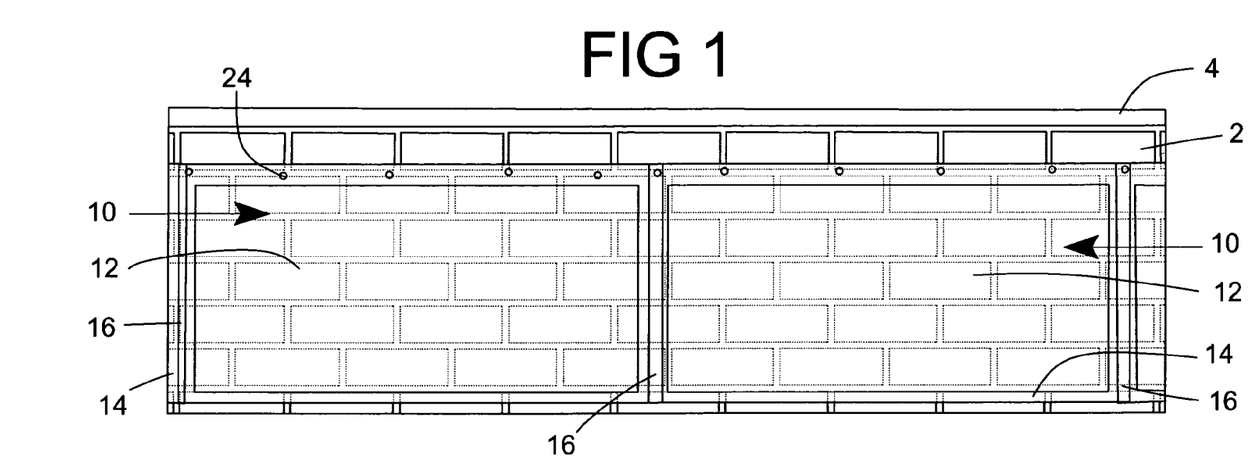
FIG. 1 is a view of one version of an insulating vapor barrier of this invention mounted on a block wall of a crawl space. A liner is shown between a foam insulating member and the wall.
Figure 2:
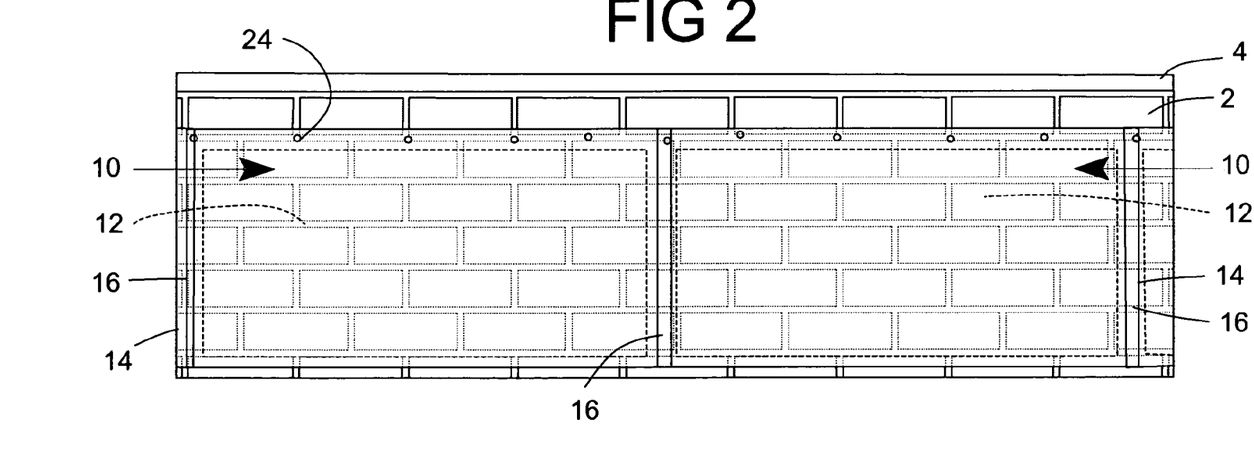
FIG. 2 is a view of a second version of the insulating vapor barrier of this invention on a block wall of a crawl space. In this view the foam insulating member is located between the liner and the wall.
Figure 3:
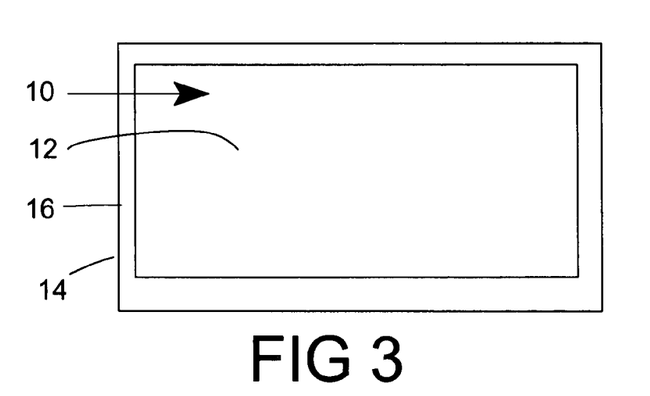
FIG. 3 is a front view of a single insulating vapor barrier panel in which a foam insulating member is laminated to the front of a film liner.
Figure 4:
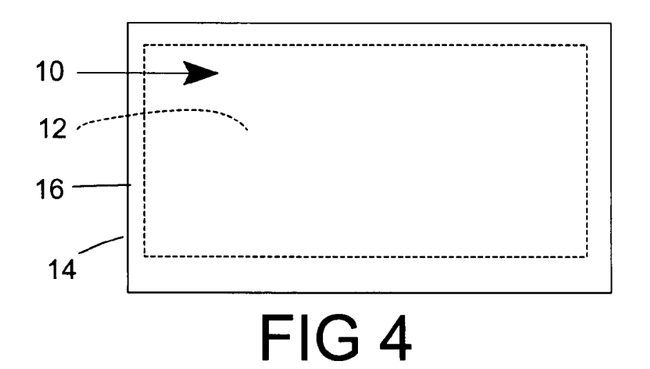
FIG. 4 is a front view of a single insulating vapor barrier panel in which a foam insulating member is laminated behind a film liner or laminated between two film liner sheets.
Figure 5:
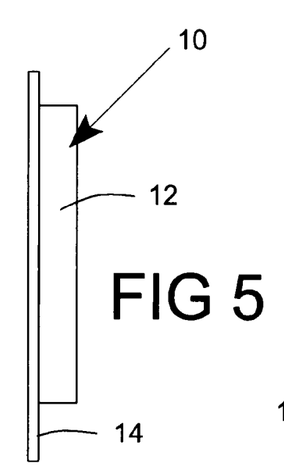
FIG. 5 is a side view of an insulating vapor barrier panel in which a single film liner sheet is laminated to an insulating foam member.

FIGS. 1 and 2 show two versions of an insulating vapor barrier 10 according to this invention, in which the insulating vapor barrier is mounted on a block wall 2 below the sill plate 4 in a crawl space. FIGS. 3 and 4 show individual insulating vapor barrier panels 10 that correspond respectively to FIGS. 1 and 2. FIG. 1 shown a version in which the insulating vapor barrier 10 includes an insulating foam member 12 laminated to a liner 14, which is positioned between the block wall 2 and the insulating foam member 12. The liner 14 comprises a sheet layer that is vapor resistant. The liner 14 extends beyond the edges of the foam member 12 along the top, the bottom and on each side.

A series of fastening means, represented in FIGS. 1 and 2 by pre-punched holes 24 extend along the top edge of liner 14 above the foam member 12. A fastener mounted in the block wall 2 can fit though these holes 24 so that the insulating vapor barrier 10 can be easily mounted on the wall 2. Other means may be employed to mount the insulating vapor barrier 10 on the block wall 2, and these representative fastener means will be discussed in greater detail with reference to FIGS. 9-13.

Individual insulating vapor barrier panels 10 can be positioned side by side so that the portion of the liners 14 extending beyond the insulating foam member will form an overlapping section 16 along each edge. These side edges can then be sealed by using a caulk sealant or an adhesive tape or by other conventional means that will maintain a vapor tight seal.

The lower edge of liners 14 will allow for an overlap between liners 14 and a ground, liner 20, such as that shown in FIGS. 5-8 and illustrated in the schematics of FIGS. 14-18. The liners 14 and 20 can be sealed by employing conventional adhesive means as discussed with reference to the side seams.

FIG. 2 is similar to FIG. 1, but it shows an insulating vapor barrier 10 in which at least one layer of a liner 14 extends over the front of the insulating foam member 12, as viewed from this perspective. In other words, the insulating foam member 12 is between an outer layer of liner 14 and the block wall 2. The configuration of FIG. 2 can be formed by merely reversing the insulating foam barrier panels 10 shown in FIG. 1 and in the side view of FIG. 5 or FIG. 6, or a multi-layer liner can be employed. FIG. 7 shows a version in which the foam member 12 is encapsulated by two layers of liner 14, which are laminated on opposite faces of the insulating foam member 12. In the embodiment of FIG. 7, the two layers along the side edges of the liner 14 would be laminated to each other along the top and the sides. However, the two liner layers would not be laminated or secured to each other along the bottom edges. Flaps 18 would be formed.

Figure 6:
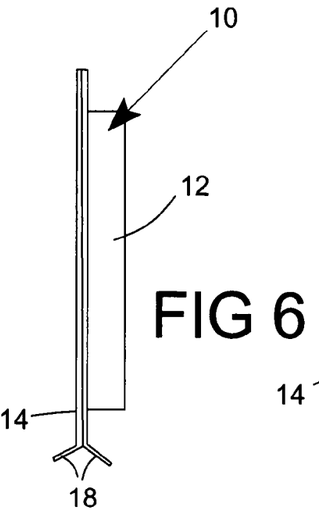
FIG. 6 is a side view of an alternate embodiment of a insulating vapor barrier panel in which the liner is formed of two separate layers laminated along most of their surfaces, but with the two layers being separate at the lower end of the liner.
Figure 7:
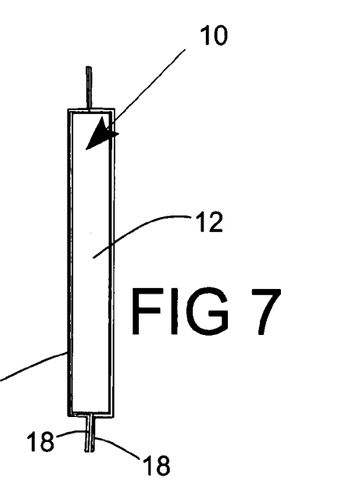
FIG. 7 is a side view of another embodiment of the insulated vapor barrier panel in which an insulating foam member is encapsulated by two liner layers.
Figure 8:
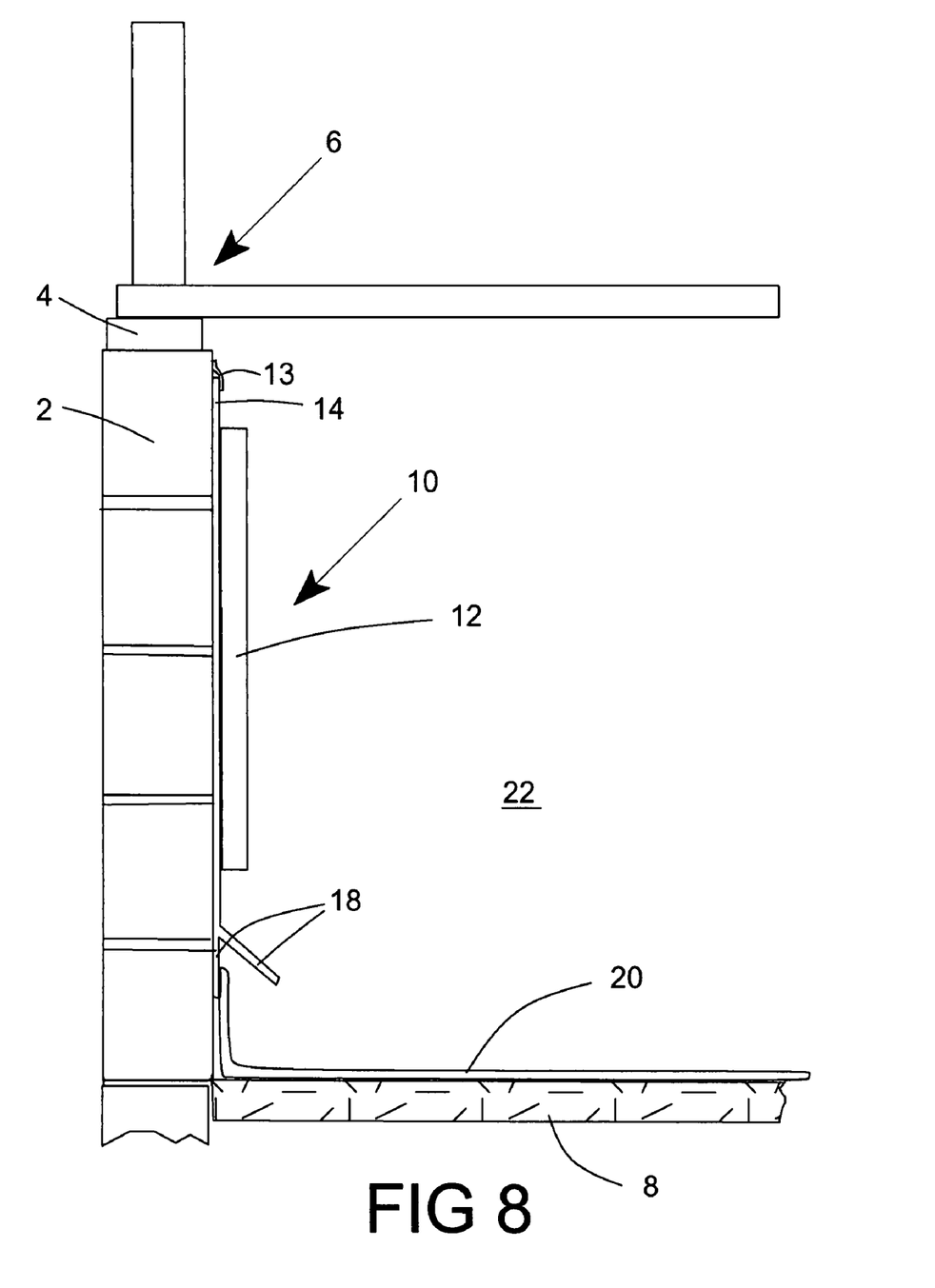
FIG. 8 is a side view of an insulated vapor barrier panel of the type shown in FIG. 6 mounted on a block wall, with a portion of a ground surface liner positioned between two layers of the wall vapor barrier liner, which can be subsequently secured together around an edge of the ground surface liner.
Figure 9:
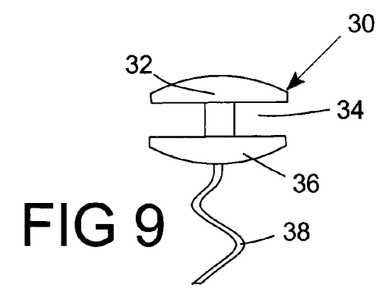
FIG. 9 is a view of a fastener that can be mounted in mortar as the wall is assembled.

FIG. 6 shows another version of a two layer liner 14 with flaps 18 located along the bottom edge. FIG. 8 shows the manner in which the insulating vapor barrier 10 of FIG. 6 would be mounted on a wall 2 of a crawl space 22. Insulating vapor barrier 10 would be fastened to the wall 2 by any of a number of means. The liner 14 would be fastened to the block wall 2 just below the sill plate 4 and just below the floor system 6. In FIG. 8, the insulating vapor barrier 10 would be used with a ground vapor barrier liner 20, which would lay flat along the ground 8. Edges of the ground vapor barrier liner 20 would be folded upward and edges would be placed between the two flaps 18. FIG. 8 shows an intermediate step in the installation of the vapor barriers. After an edge of ground vapor barrier 20 is placed between flaps 18, the outer flap will be folded down so that the edge of ground vapor barrier 20 will be trapped between the two flaps 18. These two vapor barriers can then be sealed along the seam formed at their intersection. An appropriate conventional vapor sealant could be employed. A tape, such as vapor sealing tape of commonly available types, could be employed, and it would provide not only a vapor seal but also a mechanical attachment that would prevent disengagement of the two liners during use Representative means of fastening insulating vapor barrier panels to a crawl space wall are shown in FIGS. 9-13. FIG. 9 shows a fastener 30 that can be embedded in the mortar as the blocks are laid to form the wall. These fasteners include an outer cap 32 and an inner stop member 36 on opposite sides of a gap 34. The inner stop member 36 insures that the insertion depth of the fasteners will be consistent. A serpentine or corkscrew shaft 38 extending from the stop 36 would be embedded in the mortar before it sets up will rigidly secure fastener 30 in place. The width of cap 30 is chosen so that it will fit within pre-punched holes 24 located along the upper liner edge 14 as shown in FIG. 11. The width of the gap 34 is chosen so that the liner 14 will fit therein.

Figure 10:
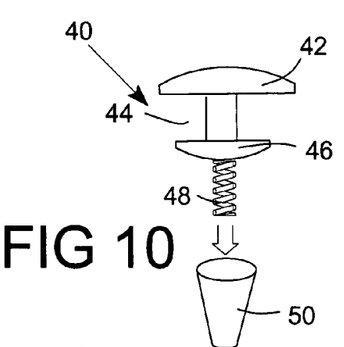
FIG. 10 is a view of an alternate version of a fastener that can be attached to a wall by drilling into the mortar of an existing block wall.
Figure 11:
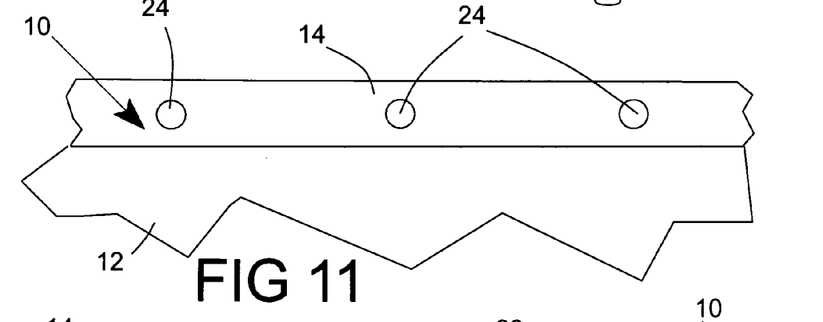
FIG. 11 is a view an edge of an insulating vapor barrier panel in which holes for mounting the barrier panel on fasteners of the type shown in FIGS. 9 and 10 have been provided in the liner.

FIG. 10 shows another version of a fastener in which an attachment member 40 can be inserted into a receptacle 50. This embodiment is intended for use in a preexisting block wall 2. Holes can be drilled into mortar that has already set up or in an older wall. The receptacle 50 is secured in these holes and the fastener 40 is then inserted into an interference fit with the receptacle 50. Fastener 40 also has two caps 42 and 46 flanking a gap 44. A serpentine shaft 48 can be screwed or twisted into receptacle 50 and will form a tight fit with the interior surface of receptacle 50 to hold fastener 40 firmly in place. The insulating vapor barrier panel 10, shown in FIG. 11 can be employed with fastener 40 in much the same manner as with fastener 30.

Figure 12:
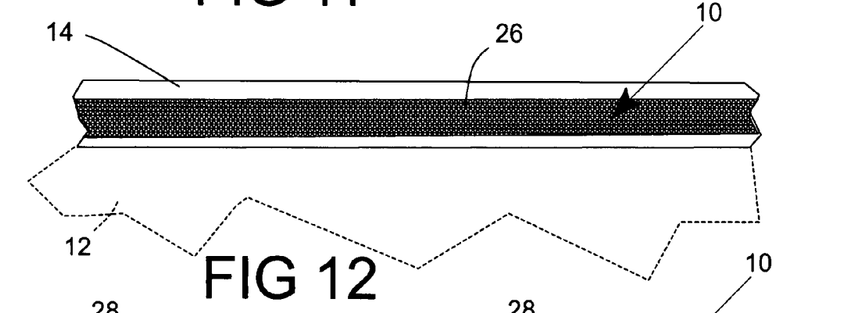
FIG. 12 is a rear view of an insulating vapor barrier panel with a hook or loop fastener strip is located on the liner, so that the panel can be attached to a complementary hook or loop faster attached at an appropriate position on an existing block wall.
Figure 13:
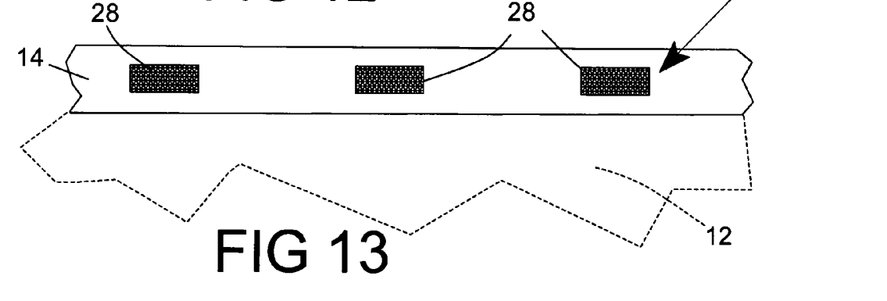
FIG. 13 is a rear view of another version of a vapor barrier panel with hook or loop fastener segments disposed on the liner at spaced locations.

FIGS. 12 and 13 show two versions of insulating vapor barrier panels 10 that can employ hook and loop fasteners along the top edge of liner 14. FIG. 12 shows a version in which a continuous hook or loop member 26 is located along the edge of line 14. FIG. 13 shows a version in which a series of discrete hook or loop members 28 are spaced along the top edge of liner 14. The members 26 and 28 can be either a hook or a loop member that can be affixed to a complementary loop or hook member secured at appropriate positions along a block wall 2. One advantage of the fastener embodiments shown in FIGS. 9-13, is that the upper edges of insulating vapor barrier 10 can be selectively and temporarily removed for inspections, such as for termite inspections. Numerous other means can be employed to fasten the insulating vapor barrier panels to a wall, and these embodiments are intended to only be representative.

Figure 14:
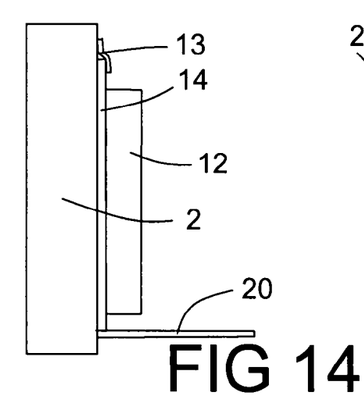
FIG. 14 is a schematic view of one approach to forming a vapor barrier along the ground and along the wall of a crawl space. The foam insulating member is located on the inside of a liner along the wall.
Figure 15:
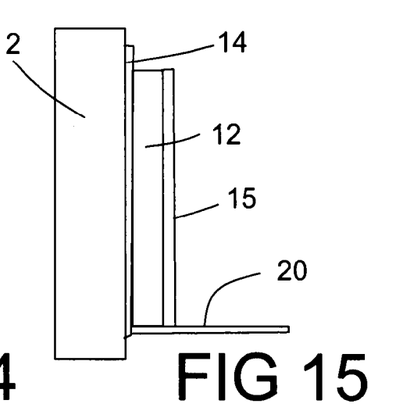
FIG. 15 is another schematic view similar to FIG. 14 in which the insulating foam member is mounted between two liner layers.
Figure 16:
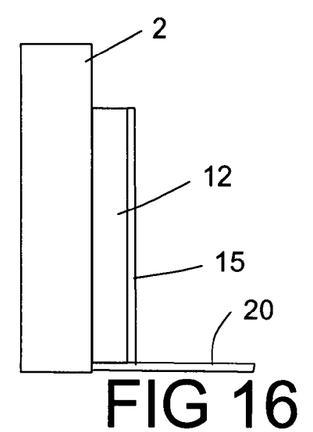
FIG. 16 is a another schematic view similar to FIG. 14 in which the insulating foam member is located between the wall and the liner.
Figure 17:
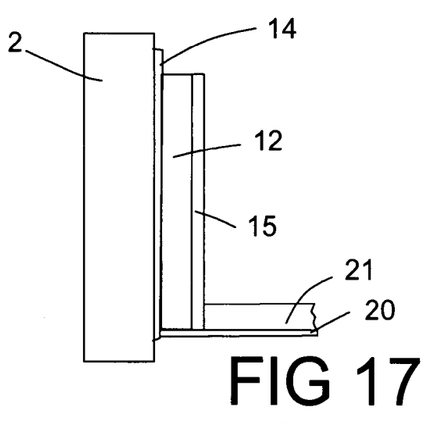
FIG. 17 is still another schematic view in which an insulting foam layer is located above a liner placed on the ground in a crawl space. The insulating foam member along the wall is laminated between two liner layers.
Figure 18:
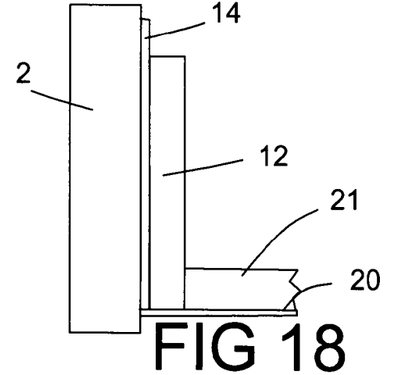
FIG. 18 is a fifth schematic view in which a foam layer is located above the ground liner. The insulating foam member along the wall is laminated to only a single liner layer.
Figure 19:
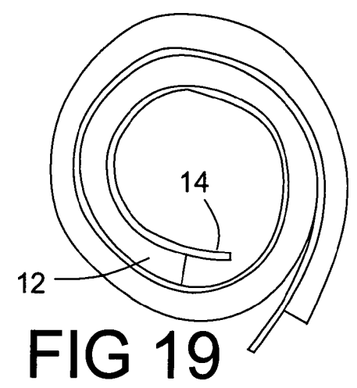
FIG. 19 is a view of a rolled configuration of the insulating vapor barrier.

The schematics of FIGS. 14-18 show various versions of insulating vapor barriers according to this invention and the manner in which they can be installed. FIGS. 14-16 show version in which insulating vapor barriers 10 can be employed with a ground vapor layer barrier 20. FIGS. 14 and 16 show versions in which the liner 14 is located on a single side of the insulating foam member 12. A sealing strip 13, which can be in the form of a sealing tape, that seals the top edge of the liner 14 to the block wall 2 is shown in FIG. 14. A sealing strip of this type could be used with all of the representative embodiments depicted herein. FIG. 15 shows a version in which the liner comprises two layers 14 and 15. FIGS. 17 and 18 shows a version in which a foam insulating member 21 is employed with ground vapor barrier 20. FIGS. 14-18 show versions in which a flat foam insulating member 12 is employed. FIG. 19 shows a version in which the foam member 12 is more flexible, and the insulating vapor barrier can be rolled up for shipment and installed flat against the crawl space wall.

Figure 20:
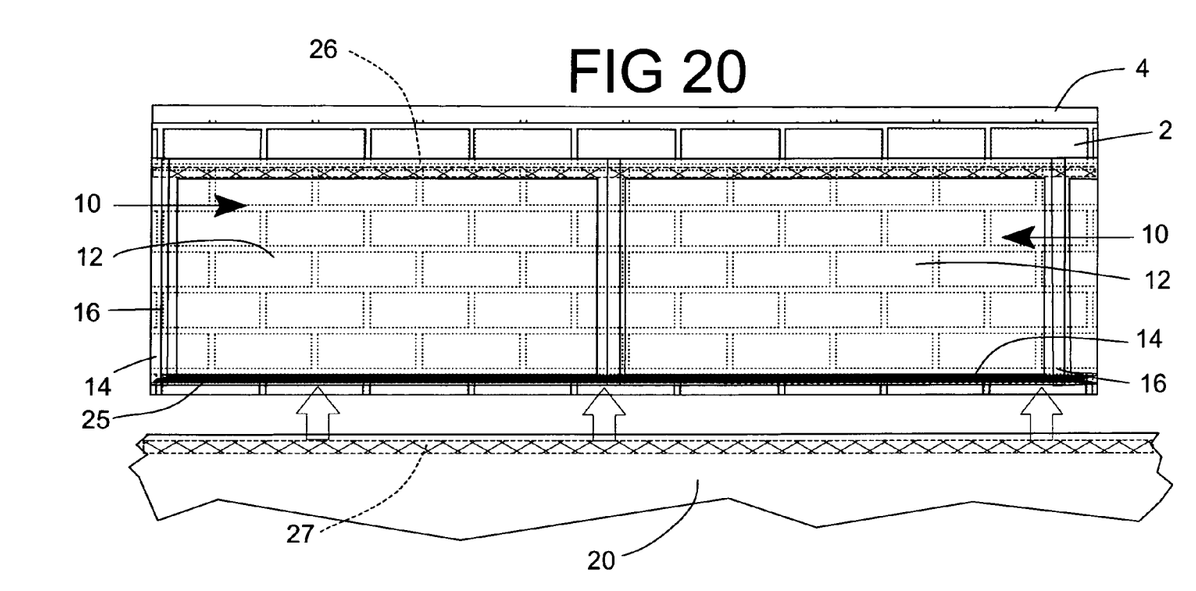
FIG. 20 shows a portion of a crawl space in which insulating vapor barrier panels are attached to a wall and a ground liner is shown in a position in which it can be detachably secured to the lower end of the insulating vapor barrier panels.

FIG. 20 is a view of an alternate version of the insulating vapor barrier. Here a series of insulating vapor barrier panels 10 are mounted on a wall 2 by using a continuous strip of hook or loop fastener 26 extending along the top edge of the liner 14. In FIG. 20 the fastener strip 26 is hidden on the back side of the liner 14. In this embodiment a second fastener strip 25 is located on the front of the bottom edge of the liner 14. A complementary fastener strip 27 is located along an edge of the ground liner 20. Fastener strips 25 and 27 can be detachably secured to each other to attach the liner 14 located along the wall with the horizontal ground liner 20. An advantage of employing these detachable fasteners is that the ground liner 20 can be selectively detached from the wall liner 14 for periodic terminate inspection and for the selective application of treating chemicals such as pesticides. This is especially important where it is necessary to prevent termite damage. The liners 14 and 20 can then be reattached to again form a continuous vapor barrier. The embodiment of FIG. 20 shows the use of insulating vapor barrier panels 10, but it should be understood that the ground liner 20 can be similarly attached and detached to a liner 14 that does not include a foam insulating member. If roll type fiberglass insulation is placed between the floor joists to provide insulation, the foam insulating member may not be necessary.

Figure 21:
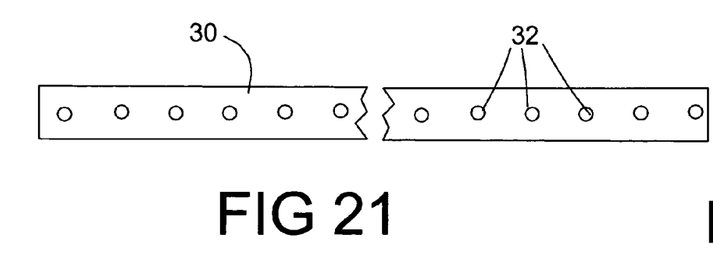
FIG. 21 shows a mounting strip that can be attached to a crawl space wall with projections that can be inserted into perforations in a liner of an insulating vapor barrier or a vapor barrier liner.
Figure 22:
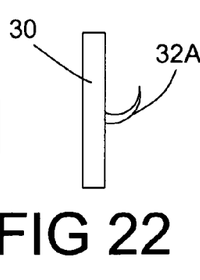
FIG. 22 is a side view showing a hook projection that can be used on the mounting strip of FIG. 21.

Another approach to mounting the liner 14 or the insulating vapor barriers 10 to a wall is shown in FIG. 21. Instead of employing discrete fasteners or a continuous hook or loop fastener, a strip 30 including a series of projections 32 can be mounted on the wall with the projections 30 extending beyond the strip 30. FIG. 22 shows a hook type fastener 32A, which could be employed. These projections 32 can fit in perforations along the top edge of a liner 14 to mount the vapor barrier on the wall. The perforations can be stamped along the top edges of the liner 24 or they can be cut or formed as the projections are forced through the liner 14. The use of preformed perforations can prevent the liner from splitting which could occur over time if the projections were relied upon to cut holes in the liner during installation.

Figure 23:
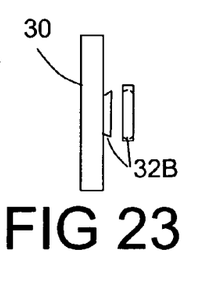
FIG. 23 is a side view of an alternate snap fastener arrangement that can be used on either the mounting strip of FIG. 21.

FIG. 23 shows an alternate to the hook shaped projections 32A. Snap fasteners 32B could be employed with one fastener being attached to the strip 30 and the other fastener attached to the liner 14. Snap fasteners 32B could also be employed at the mating edges of the liners 14 and 20 for attaching the two vapor barriers as shown in FIG. 20.

The various fastener systems depicted herein can be employed either with an insulating vapor barrier in which a foam member is employed on either or both of the wall vapor barrier liner 14 and/or the ground liner 20 or in applications in which only a vapor barrier is employed and insulating foam is not located on either liner. These fastener systems would simplify installation of vapor barriers, especially in crawl spaces.

In one version of the system the insulating foam member can comprise a polyolefin foamed plastic with a laminated film or laminated vapor barrier liner, which is applied to the masonry or block work of the crawl space. This component can be two to three inches thick and can provide an insulating R value of 11-19 and a superior vapor barrier. The foamed plastic, which has a density range of from 0.75-2 pounds per cubic foot, is lightweight and relatively easy to install, form, and cut with a utility knife. The foamed polyolefin can be supplied in rolled polyethylene sheets of 2×48×108 inches. It is from 0.75-2 pounds density polyethylene that has a compressive strength of one pound per square inch, a tensile strength of 56 pounds per square inch and an elongation of 85%. It can be extruded and can incorporate a fire retardant. This foam is closed cell, so it will not wick or retain water if it gets wet. Other types of foam systems might be more cost effective but will absorb water. A protective layer of polyethylene film 0.002-0.012 inch thick can be laminated to the foamed plastic polyolefin to give it additional strength.

Another type of material that can be used for another version of the present invention is an expanded polystyrene (EPS) foamed plastic. This foam with a thickness of 2 inches provides an R value in a range of from 7.7-9.6 and the liner can be affixed to the masonry with either a mechanical fastener or an adhesive caulk. Applying a laminated film with a thickness of from 0.002-0.012 inch enhances the structural strength of the combined product. Application of the film ensures that the laminated combination of film and foam will provide a successful vapor barrier. The foam combined with the film provides both the insulating properties and the vapor barrier needed for a satisfactory crawl space encapsulating system. Having a laminated material provides for both moisture control and energy savings due to improvement of the R-value. The EPS film laminate can be easily installed with a utility knife to cut the sheets and fit them over walls and around other obstacles. The EPS laminate is taped at joints with duck tape to ensure the airtight nature of the system. Film can be applied on one side of the EPS sheets or on both sides of the sheets.

EPS is lightweight compared to other systems used to encapsulate crawl spaces. Other systems use heavy rolls of material like polyethylene and vinyl, typically weigh over 100 pounds and are very difficult to maneuver inside a crawlspace. EPS is an excellent choice as an insulator as part of a vapor barrier because it is not adversely affected by moisture as is fiberglass insulation. Fiberglass will lose its ability to protect and insulate when is becomes moist. EPS with the laminated film will not absorb moisture. The EPS foam typically has a density range of from 0.7-1.2 pounds per cubic foot. The compressive resistance at a 10% deformation is from 5-13 pounds per square inch according to ASTM D-1621. The flexural strength as tested pursuant to ASTM C-203 may have values of from 10-30 pounds per square inch. It will have a water absorption range by a percentage of maximum volume of 3-4. EPS has a flame spread value of 20 in a UL test and a smoke developed range of from 150-300.

From the preceding description, it can be seen that a crawl space encapsulation system has been provided that will meet all of the advantages of prior art devices and offer additional advantages not heretofore achievable. With respect to the foregoing invention, the optimum dimensional relationship to the parts of the invention including variations in size, materials, shape, form, function, and manner of operation, use and assembly are deemed readily apparent to those skilled in the art, and all equivalent relationships illustrated in the drawings and described in the specification are intended to be encompassed herein.

The foregoing is considered as illustrative only of the principles of the invention. Numerous modifications and changes will readily occur to those skilled in the art, and it is not desired to limit the invention to the exact construction and operation shown and described. All suitable modifications and equivalents that fall within the scope of the appended claims are deemed within the present inventive concept.

What is claimed is:

1. A crawl space insulation system for preventing the entry of water vapor and ground water into the crawl space of a building, the crawl space having a floor surrounded by a substantially continuous peripheral foundation formed by rows of modular blocks enclosing the crawl space beneath the building and supporting the building structure, the system comprising: a ground level layer covering the ground level of the crawl space to provide a barrier against the penetration of ground water and water vapor up through the ground level and into the airspace of the crawl space; a barrier layer engaging at least some of the rows of modular blocks and extending to a height greater than the corresponding ground level at the exterior surface of the foundation; means fastening the barrier layer to at least some of the rows of modular blocks; and a sealing strip positioned between the top row of modular blocks and the building structure, wherein the barrier layer comprises an insulating foam member laminated to a vapor barrier liner comprising a vapor resistant film, the liner extending beyond the insulating foam member alone a top edge, a bottom edge and both side edges of the insulating foam member for a sufficient distance so that an upper edge can be sealed to the wall and fastened to the wall to support the insulating vapor barrier panel on the wall, and side edges of the liner extend beyond the insulating foam member for sufficient distance so that the liner can be positioned to overlap side edges of adjacent vapor barrier panels forming the vapor barrier along the wall.

2. The system as claimed in claim 1 wherein the ground level layer is a layer of polyethylene foam from 0.12-0.5 inch thick and a covering of polyethylene film from 0.002-0.012 inch thick.

3. The system as claimed in claim 1 wherein the barrier layer is a layer of polyolefin foam from 2-3 inches thick and a covering of polyethylene film from 0.002-0.012 inch thick.

4. The system as claimed in claim 1 wherein the barrier layer is expanded polystyrene (EPS) substantially 2 inches thick laminated to a 0.002-0.012 inch thick film.

5. The system as claimed in claim 1 wherein the barrier fastening means is at least one fastener having a shaft portion, a cap secured to one end of the shaft portion, a stop member secured to the shaft portion and a securing portion forming the other end of the shaft portion securing the fastener to at least some of the rows of modular blocks, and wherein the barrier fastening means is perforated at predetermined locations to cooperatively receive preselectively positioned fasteners.

6. The system as claimed in claim 5 wherein the barrier fastening means further comprises a receptacle member selectively positioned within the rows of modular blocks to cooperatively receive the securing portion of the shaft portion.

* * * * *